US012612097B1

(12) United States Patent
Larson et al.

(10) Patent No.: US 12,612,097 B1
(45) Date of Patent: Apr. 28, 2026

(54) STATIONARY STEERING WHEEL SYSTEM

(71) Applicant: GM Global Technology Operations LLC, Detroit, MI (US)

(72) Inventors: Travis Steve Larson, Washington, MI (US); Christopher J. Mielke, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 8 days.

(21) Appl. No.: 18/931,425

(22) Filed: Oct. 30, 2024

(51) Int. Cl.
B62D 1/184 (2006.01)

(52) U.S. Cl.
CPC .................................... B62D 1/184 (2013.01)

(58) Field of Classification Search
CPC . B62D 1/184; B62D 1/16; B62D 1/18; B62D 1/183
See application file for complete search history.

(56) References Cited

U.S. PATENT DOCUMENTS

| | | | | | |
|---|---|---|---|---|---|
| 10,773,747 | B2 * | 9/2020 | Ku | .......................... | B62D 1/192 |
| 2017/0369091 | A1 * | 12/2017 | Nash | ....................... | B62D 1/185 |
| 2019/0077438 | A1 * | 3/2019 | Collier | ................... | B62D 1/185 |

FOREIGN PATENT DOCUMENTS

| | | | | | |
|---|---|---|---|---|---|
| CN | 211336154 U | * | 8/2020 | | |
| CN | 112937677 A | | 6/2021 | | |
| DE | 19826014 A1 | * | 2/1999 | .............. | B62D 1/20 |
| DE | 102005002457 A1 | | 8/2005 | | |
| DE | 102018203422 A1 | | 9/2019 | | |
| JP | 2021046192 A | | 3/2021 | | |
| WO | WO-2021077969 A1 | * | 4/2021 | .......... | A63F 13/285 |

OTHER PUBLICATIONS

Yang, WO-2021077969-A1, Machine Translation of Specification (Year: 2021).*
Zhang, CN-211336154-U, Machine Translation of Specification (Year: 2020).*
Higashino, DE-19826014-A1, Machine Translation of Specification (Year: 1999).*

* cited by examiner

*Primary Examiner* — Jason D Shanske
*Assistant Examiner* — Matthew Joseph Ganci
(74) *Attorney, Agent, or Firm* — Vivacqua Crane, PLLC

(57) ABSTRACT

A steering system for a vehicle includes an upper shaft having a first distal end adapted to support a steering wheel thereon, a lower shaft, and a slidable sleeve selectively moveable between an engaged position and a disengaged position, wherein when in the engaged position, the slidable sleeve is adapted to connect the upper shaft to the lower shaft, functionally connecting the steering wheel to the steering system, and when in the disengaged position, the slidable sleeve is adapted to disconnect the upper shaft from the lower shaft, functionally disconnecting the steering wheel from the steering system and secure the upper shaft and the steering wheel in a stationary position.

20 Claims, 9 Drawing Sheets

STATIONARY STEERING WHEEL SYSTEM

INTRODUCTION

The present invention relates generally to a steering system for a vehicle, and more particularly, to a system adapted to selectively 1) connect the steering wheel to the steering system, or 2) disconnect the steering wheel from the steering system and lock the steering wheel in a centered position.

During autonomous operation of a vehicle, the steering wheel may not be needed, as the vehicle is being controlled by the steering system autonomously and there is no need for input from a driver within the vehicle under certain conditions. Movement of the steering wheel, corresponding to autonomous steering of the vehicle, during autonomous operation of the vehicle may not be desirable. Further, unrestricted free-wheel movement of the steering wheel when disconnected during autonomous operation of the vehicle is not desirable.

Thus, while current systems and methods achieve their intended purpose, there is a need for a new and improved system and method for connecting a steering wheel to the steering system for manual driving situations and selectively disconnecting the steering wheel from the steering system and locking the steering wheel in a stationary position during autonomous operation of the vehicle.

SUMMARY

According to several aspects of the present disclosure, a steering system for a vehicle includes an upper shaft having a first distal end adapted to support a steering wheel thereon, a lower shaft, and a slidable sleeve selectively moveable between an engaged position and a disengaged position, wherein, when in the engaged position, the slidable sleeve is adapted to connect the upper shaft to the lower shaft, functionally connecting the steering wheel to the steering system, and, when in the disengaged position, the slidable sleeve is adapted to disconnect the upper shaft from the lower shaft, functionally disconnecting the steering wheel from the steering system, and secure the upper shaft and the steering wheel in a stationary position.

According to another aspect, the lower shaft includes a cylindrical spline collar, a distal end of the lower shaft inserted within the spline collar, an outer surface of the lower shaft and an inner surface of the cylindrical spline collar having a splined engagement with one another such that the lower shaft and the spline collar rotate unitarily, the upper shaft having a cylindrical shaped second distal end, the spline collar positioned within the second distal end of the upper shaft, the slidable sleeve having a cylindrical shape and extending around the second distal end of the upper shaft, an outer surface of the upper shaft and an inner surface of the slidable sleeve having a splined engagement with one another such that the upper shaft and the slidable sleeve rotate unitarily, the second distal end of the upper shaft including a plurality of flexible fingers, wherein, when the slidable sleeve is moved to the disengaged position, a gap is present between an inner surface of the flexible fingers of the second distal end of the upper shaft and an outer surface of the splined collar, and the splined collar and lower shaft are rotatable relative to the upper shaft and the slidable sleeve, functionally disconnecting the steering wheel from the steering system, and, when the slidable sleeve is moved to the engaged position, a ramped inner surface of the slidable sleeve pushes against an outer surface of the flexible fingers forcing an inner surface of the flexible fingers into engagement with an outer surface of the splined collar, wherein the splined collar and lower shaft are frictionally engaged with the lower shaft such that the lower shaft and the upper shaft rotate unitarily, functionally connecting the steering wheel to the steering system.

According to another aspect, the slidable sleeve includes a flexible inwardly facing tab positioned proximal to a first distal end of the slidable sleeve and the outer surface of the flexible fingers of the upper shaft include a radial notch, wherein, when the slidable sleeve is moved to the engaged position, the flexible inwardly facing tab engages the radial notch formed within the outer surface of the flexible fingers to retain the slidable sleeve in the engaged position.

According to another aspect, the steering system includes a stationary jacket, the slidable sleeve, the second distal end of the upper shaft, the spline collar and the distal end of the lower shaft enclosed within the jacket, the jacket including a pin extending radially inward, the slidable sleeve including an axial slot formed within a second distal end of the slidable sleeve, wherein, when the slidable sleeve is in the disengaged position, the pin is adapted to engage the axial slot of the slidable sleeve, preventing rotation of the slidable sleeve and the upper shaft.

According to another aspect, the spline collar includes a tab extending radially outward from a distal end of the spline collar, the slidable sleeve including an axial notch formed within the first distal end of the slidable sleeve, wherein, when the slidable sleeve is in the engaged position, the tab of the spline collar engages the axial notch of the slidable sleeve, wherein engagement of the tab of the spline collar with the axial notch of the slidable sleeve prevents rotation of the spline collar and the lower shaft relative to the slidable sleeve and the upper shaft.

According to another aspect, when the slidable sleeve is in the engaged position, the pin is positioned immediately adjacent the second distal end of the slidable sleeve, when the slidable sleeve is in the disengaged position, the tab is positioned immediately adjacent the first distal end of the slidable sleeve, and during transitional movement of the slidable sleeve between the engaged and disengaged positions, the pin of the jacket is engaged with the axial slot formed within the second distal end of the slidable sleeve, and, simultaneously, the tab of the spline collar is engaged with the axial notch formed within the first distal end of the slidable sleeve.

According to another aspect, the system further includes a bushing positioned axially inward from the second distal end and flexible fingers of the upper shaft between an inner surface of the upper shaft and the outer surface of the spline collar, the bushing adapted to allow rotation of the spline collar relative to the upper shaft when the slidable sleeve is in the disengaged position.

According to another aspect, the system further includes an axial retention feature positioned between the inner surface of the upper shaft and the outer surface of the spline collar and adapted to prevent axial movement of the upper shaft relative to the spline collar.

According to several aspects of the present disclosure, a method of operating a steering system within a vehicle to providing selective disengagement of a steering wheel from the steering system, the steering system including an upper shaft having a first distal end adapted to support a steering wheel thereon, a lower shaft, and a slidable sleeve selectively moveable between an engaged position and a disengaged position, wherein, when in the engaged position, the slidable sleeve is adapted to connect the upper shaft to the lower shaft, functionally connecting the steering wheel to the steering system, and when in the disengaged position, the slidable sleeve is adapted to disconnect the upper shaft from the lower shaft, functionally disconnecting the steering wheel from the steering system, and to secure the upper shaft and the steering wheel in a stationary position, the method including receiving, by a system controller, via a human machine interface (HMI) in communication with the system controller of the steering system, a request from a user within the vehicle to disengage the steering wheel from the steering system, disabling, with the system controller, a shift actuator within the vehicle and preventing shifting of the transmission within the vehicle from park, sending, via the HMI, a message to the user within the vehicle indicating that disengagement of the steering wheel from the steering system is taking place and to keep hands off the steering wheel, and moving, with the controller, the slidable sleeve to the disengaged position.

According to another aspect, after receiving, via the HMI, the request from the user to disengage the steering wheel from the steering system, the method includes verifying, with the system controller, authorization of the user, verifying, with the system controller, that the steering system is operable, verifying, with the system controller, that a transmission of the vehicle is in park, aborting disengagement of the steering wheel from the steering system and sending a message to the user when the user is not authorized, aborting disengagement of the steering wheel from the steering system and sending a message to the user when the steering system is inoperable, and, aborting disengagement of the steering wheel from the steering system and sending a message to the user when the transmission of the vehicle is not in park.

According to another aspect, the method further includes, prior to moving the slidable sleeve to the disengaged position, measuring, with the system controller, via communication with a torque sensor, torque applied to the steering wheel, when torque is being applied to the steering wheel, aborting disengagement of the steering wheel from the steering system, enabling shifting of the transmission from park and sending a message to the user, and, when no torque is being applied to the steering wheel, centering, with the system controller, the steering wheel.

According to another aspect, the method further includes verifying, with the system controller, via communication with a position sensor, that the steering wheel is centered, when the steering wheel is not centered, measuring, with the system controller, via communication with the torque sensor, torque applied to the steering wheel, and when torque is being applied to the steering wheel, repeating the sending, via the HMI, the message to the user within the vehicle indicating that disengagement of the steering wheel from the steering system is taking place and to keep hands off the steering wheel, when torque is not being applied to the steering wheel, aborting disengagement of the steering wheel from the steering system, enabling shifting of the transmission from park and sending a message to the user that the steering system is blocked, and, when the steering wheel is centered, proceeding with the moving, with the controller, the slidable sleeve to the disengaged position.

According to another aspect, the method further includes, after moving, with the system controller, the slidable sleeve to the disengaged position, measuring, with the system controller, an amount of time taken to move the slidable sleeve to the disengaged position, when the amount of time taken to move the slidable sleeve to the disengaged position exceeds a predetermined threshold, aborting disengagement of the steering wheel from the steering system and sending a message to the user that disengagement was unsuccessful and re-engagement of the steering wheel to the steering system is taking place and, when the amount of time taken to move the slidable sleeve to the disengaged position does not exceed the predetermined threshold, sending a message to the user, via the HMI, that the steering wheel has been disengaged from the steering system and the vehicle is restricted to autonomous operation, and disabling, with the system controller, manual driving modes of the vehicle.

According to another aspect, the method further includes receiving, by the system controller, via the human machine interface (HMI) in communication with the system controller of the steering system, a request from the user within the vehicle to engage the steering wheel to the steering system, disabling, with the system controller, a shift actuator within the vehicle and preventing shifting of the transmission within the vehicle from park, sending, via the HMI, a message to the user within the vehicle indicating that disengagement of the steering wheel from the steering system is taking place and to keep hands off the steering wheel, and, moving, with the controller, the slidable sleeve to the engaged position.

According to another aspect, after receiving, via the HMI, the request from the user to engage the steering wheel from the steering system, the method includes verifying, with the system controller, authorization of the user, verifying, with the system controller, that the steering system is operable, verifying, with the system controller, that the transmission of the vehicle is in park, aborting engagement of the steering wheel to the steering system and sending a message to the user when the user is not authorized, aborting engagement of the steering wheel to the steering system and sending a message to the user when the steering system is inoperable, and aborting engagement of the steering wheel to the steering system and sending a message to the user when the transmission of the vehicle is not in park.

According to another aspect, the method further includes, prior to moving the slidable sleeve to the engaged position, centering, with the system controller, the steering system, verifying, with the system controller, that the steering system is centered, when the steering system is not centered, sending a message to the user that engagement was unsuccessful, aborting centering of the steering system, aborting engagement of the steering wheel to the steering system, and enabling shifting of the transmission from park, and, when the steering system is centered, proceeding with moving the slidable sleeve to the engaged position.

According to another aspect, the method further includes measuring, with the system controller, an amount of time taken to move the slidable sleeve to the engaged position, measuring, with the system controller, via communication with a force sensor, an amount of force necessary to move the slidable sleeve to the engaged position, when the amount of time taken to move the slidable sleeve to the engaged position exceeds a predetermined threshold, or, the amount of force necessary to move the slidable sleeve to the engaged position exceeds a predetermined threshold, moving, with the system controller, the slidable sleeve back to the disengaged position, and, when the amount of time taken to move the slidable sleeve to the engaged position does not exceed the predetermined threshold, and, the amount of force necessary to move the slidable sleeve to the engaged position does not exceed the predetermined threshold, displaying a message, via the HMI, that the steering wheel is engaged and all driving modes are enabled, and enabling the transmission to be shifted from park.

According to another aspect, when the amount of time taken to move the slidable sleeve to the engaged position exceeds a predetermined threshold, or, the amount of force necessary to move the slidable sleeve to the engaged position exceeds a predetermined threshold, and the slidable sleeve has been moved back to the disengaged position, the method further includes measuring, with the system controller, an amount of time taken to move the slidable sleeve back to the disengaged position, measuring, with the system controller, via communication with the force sensor, an amount of force necessary to move the slidable sleeve back to the disengaged position, when the amount of time taken to move the slidable sleeve back to the disengaged position exceeds a predetermined threshold, or, the amount of force necessary to move the slidable sleeve back to the disengaged position exceeds a predetermined threshold, displaying a message, via the HMI, that the vehicle is inoperable, and when the amount of time taken to move the slidable sleeve back to the disengaged position does not exceed the predetermined threshold, and, the amount of force necessary to move the slidable sleeve back to the disengaged position does not exceed the predetermined threshold, displaying a message, via the HMI, that the steering system needs service, the steering wheel is disengaged from steering system and the vehicle is restricted to autonomous operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

6

Figure 3:
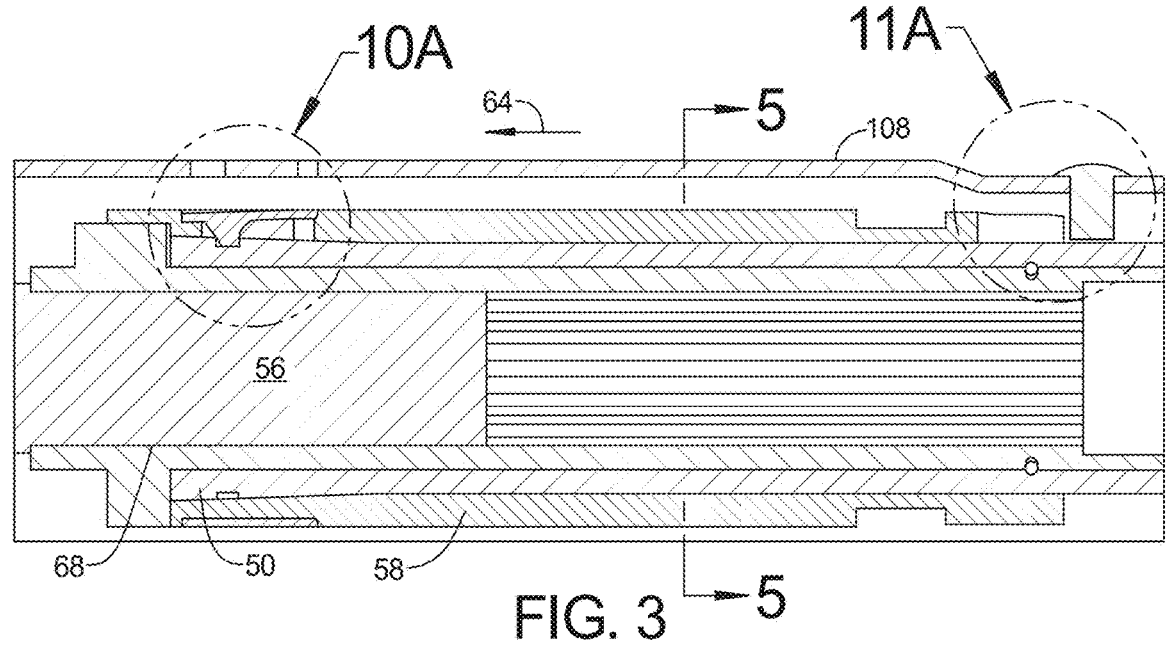
FIG. 3 is an enlarged view of a portion of FIG. 2, wherein a slidable sleeve is in an engaged position.
Figure 4:
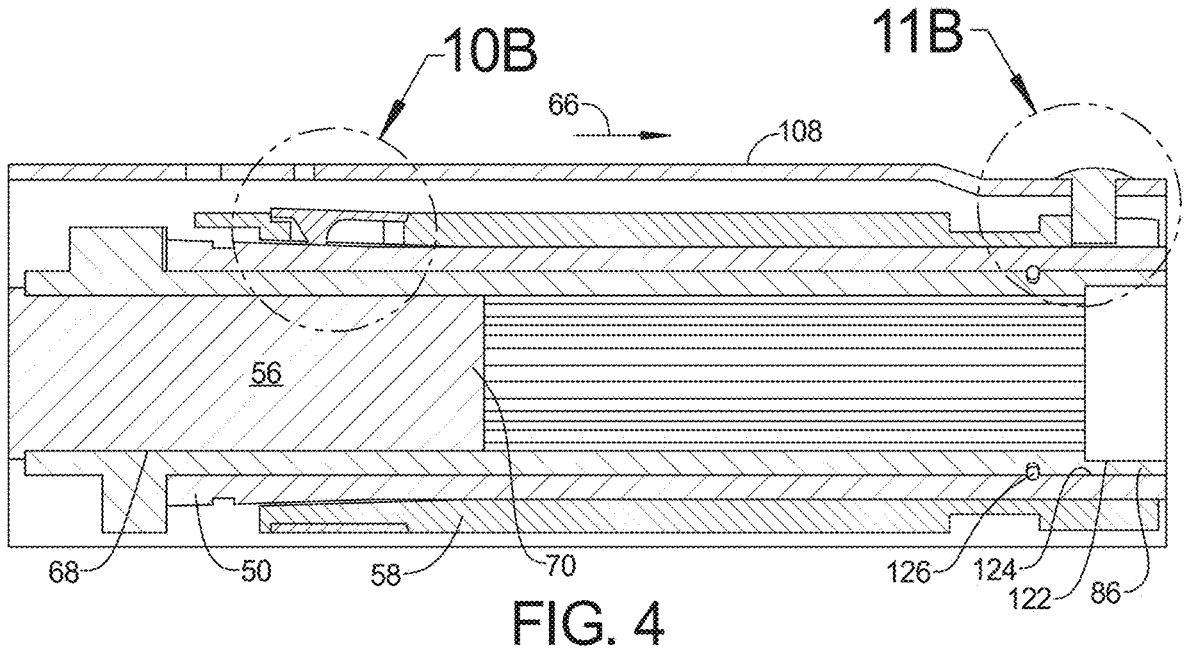
FIG. 4 is an enlarged view similar to FIG. 3, wherein the slidable sleeve is in a disengaged position.
Figures 9, 10A, 10B, 11A, 11B:
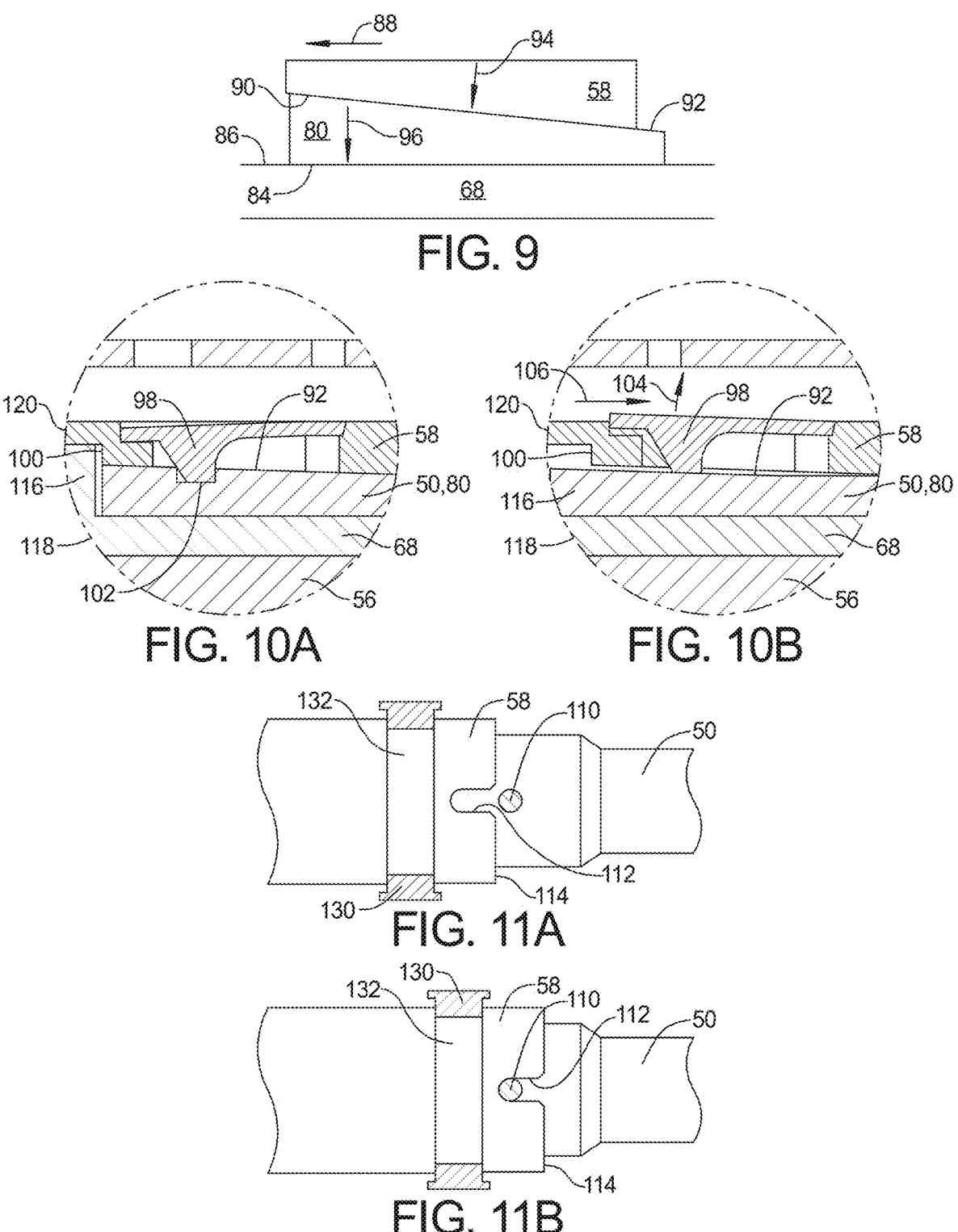
FIG. 9 is a schematic side sectional view illustrating engagement of an inner surface of the flexible fingers of the upper shaft and an outer surface of the splined collar when the slidable sleeve is in the engaged position.
FIG. 10A is an enlarged view of a portion of FIG. 3, as indicated by the circled area labelled "FIG. 10A" in FIG. 3.
Figure 12:
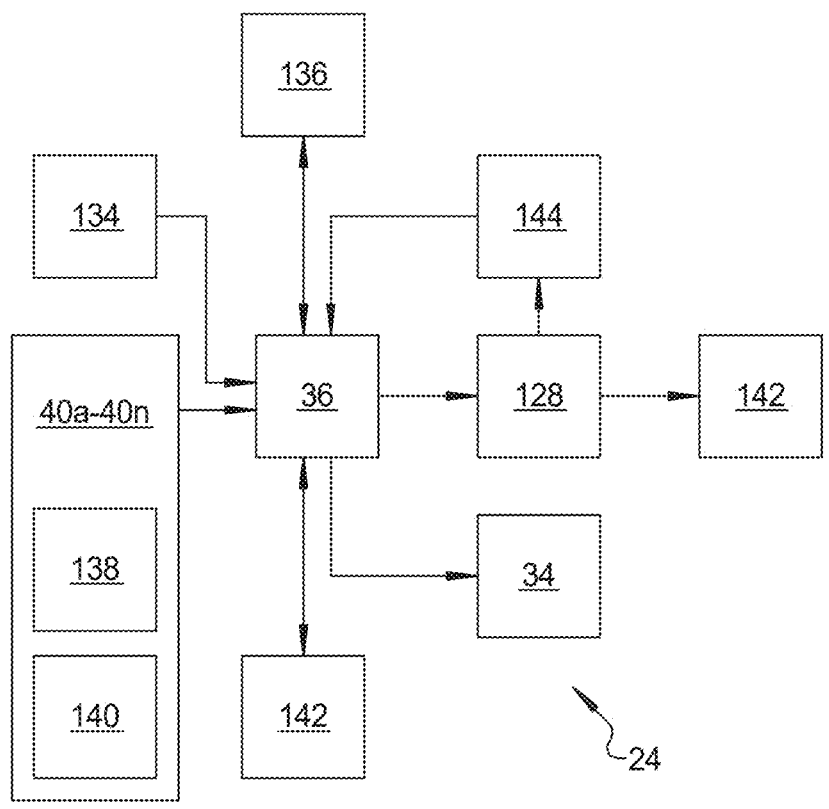
Figure 13A:
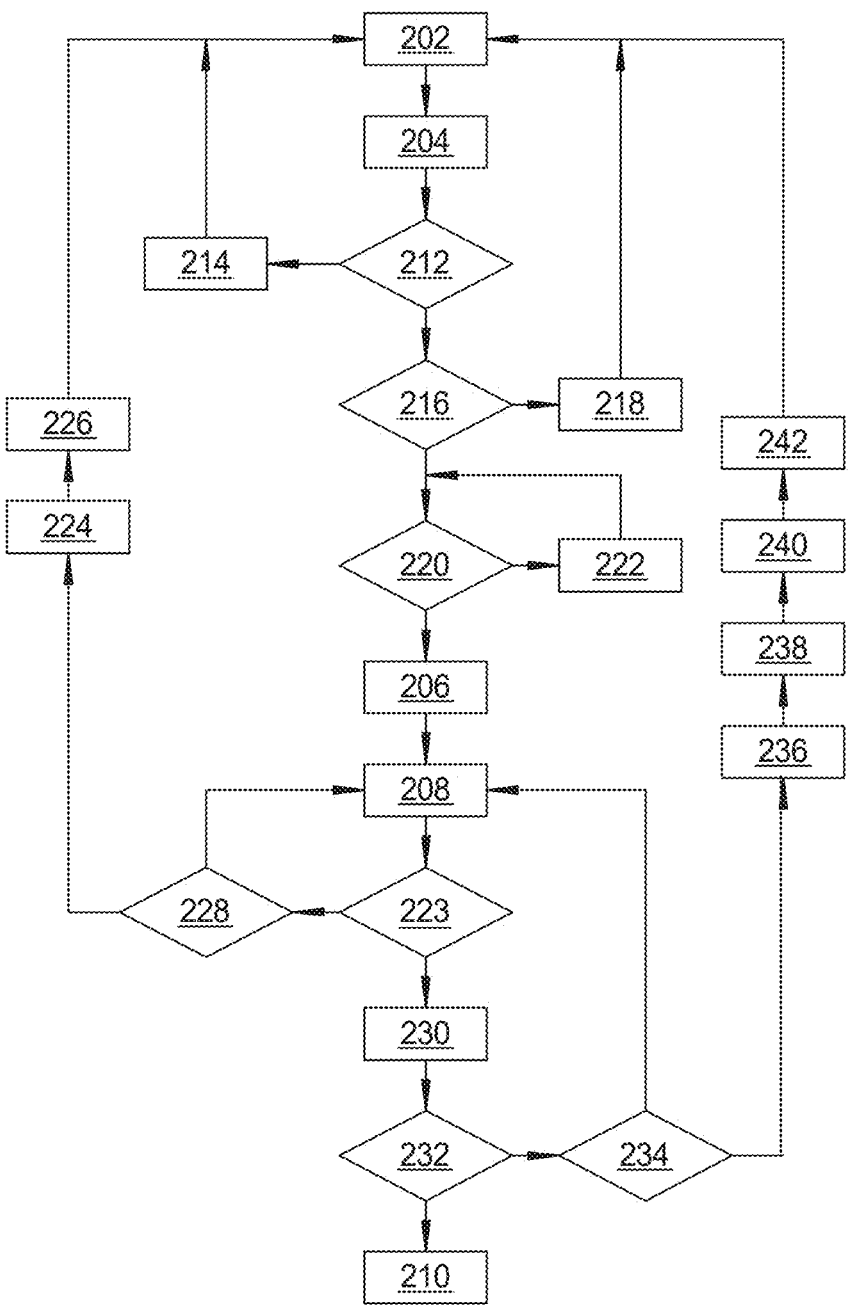
Figure 13B:
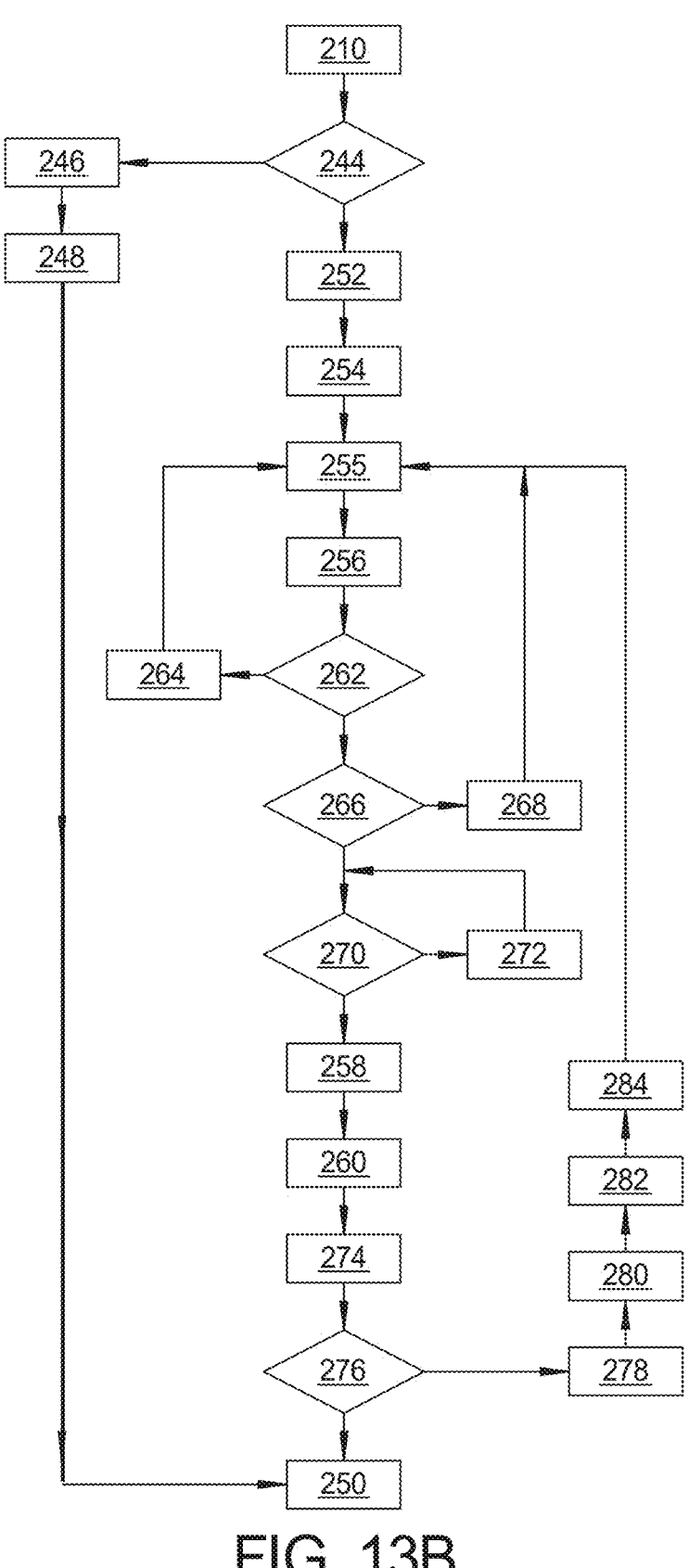
Figure 13C:
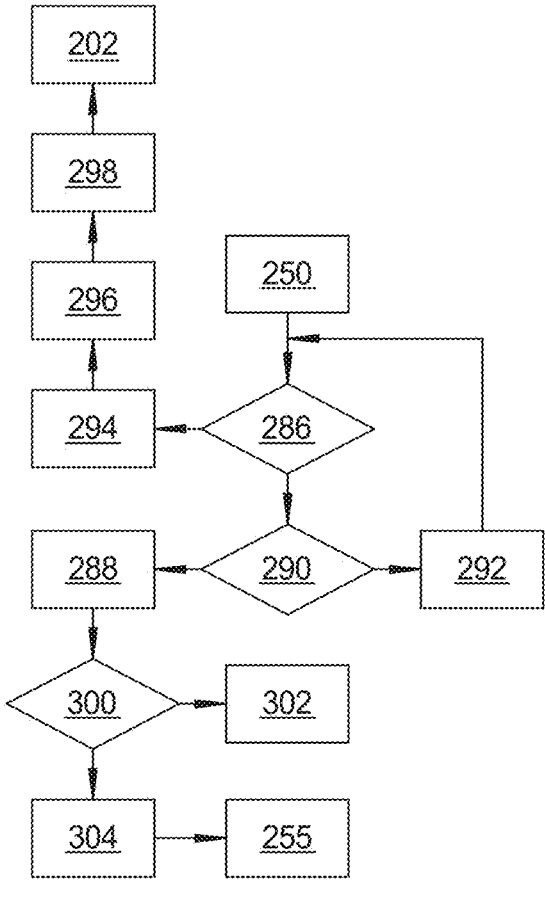

FIG. 10B is an enlarged view of a portion of FIG. 4, as indicated by the circled area labelled "FIG. 10B" in FIG. 4;

FIG. 11A is an enlarged view of a portion of FIG. 3, as indicated by the circled area labelled "FIG. 11A" in FIG. 3;

FIG. 11B is an enlarged view of a portion of FIG. 4, as indicated by the circled area labelled "FIG. 11B" in FIG. 4;

FIG. 12 is a schematic block diagram of the steering system;

FIG. 13A is a first portion of a flow chart illustrating a method according to an exemplary embodiment of the present disclosure;

FIG. 13B is a second portion of the flow chart illustrating a method according to an exemplary embodiment of the present disclosure; and FIG. 13C is a third portion of the flow chart illustrating a method according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first,"

"second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges.

In addition, disclosure of ranges includes disclosure of all values and further divided ranges within the entire range, including endpoints and sub-ranges given for the ranges.

Figure 1:
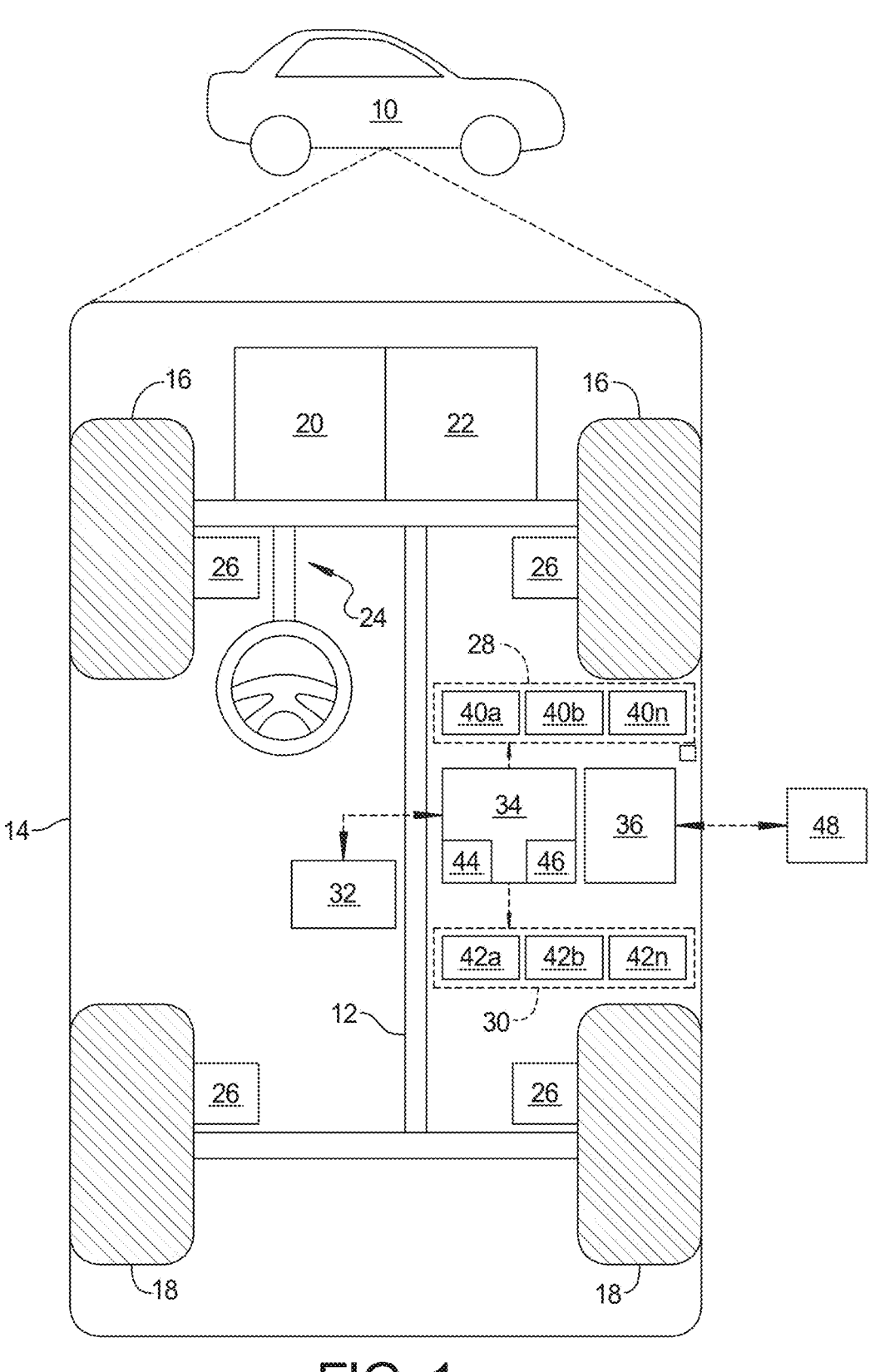
FIG. 1 is a schematic view of a vehicle having a steering system according to an exemplary embodiment of the present disclosure.

Example embodiments will now be described more fully with reference to the accompanying drawings. In accordance with an exemplary embodiment, FIG. 1 shows an autonomous vehicle 10 with an associated steering system 24. In general, the steering system 24 works in conjunction with other systems within the vehicle 10 to control steering of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

The vehicle 10 is an autonomous vehicle and the steering system 24 is incorporated into the autonomous vehicle 10. An autonomous vehicle 10 is, for example, a vehicle 10 that can be automatically controlled to carry passengers from one location to another. The vehicle 10 is depicted in the illustrated embodiment as a passenger car, but it should be appreciated that any other vehicle including trucks, sport utility vehicles (SUVs), recreational vehicles (RVs), etc., can also be used. In an exemplary embodiment, the vehicle 10 is equipped with a so-called SAE Level Four or higher automation system. A Level Four system indicates "high automation", referring to the driving mode-specific performance by an automated driving system of all aspects of the dynamic driving task, even if a human driver does not respond appropriately to a request to intervene. The vehicle 10 can operate completely autonomously, and, the vehicle 10 can also operate manually, wherein a driver within the vehicle 10 controls the vehicle 10.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and/or rear wheels 18 according to selectable speed ratios. According to various embodiments, the transmission system 22 may include a step-ratio automatic transmission, a continuously variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and/or rear wheels 18.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
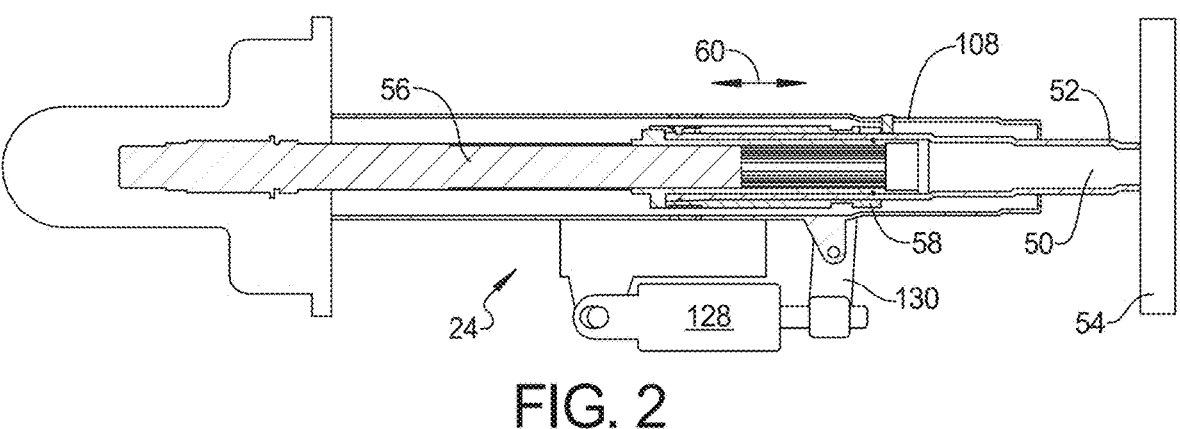
FIG. 2 is a side sectional view of the steering system.

Referring to FIG. 2, the steering system 24 includes an upper shaft 50 having a first distal end 52 adapted to support a steering wheel 54 thereon, a lower shaft 56, and a slidable sleeve 58 selectively moveable, as indicated by arrow 60, between an engaged position and a disengaged position. Referring to FIG. 3, when in the engaged position, the slidable sleeve 58 is moved toward a second distal end of 62 of the upper shaft 50, as indicated by arrow 64, and is adapted to connect the upper shaft 50 to the lower shaft 56, functionally connecting the steering wheel 54 to the steering system 24. Referring to FIG. 4, when in the disengaged position, the slidable sleeve 58 is moved toward the first distal end 52 of the upper shaft 50, as indicated by arrow 66, and is adapted to disconnect the upper shaft 50 from the lower shaft 56, functionally disconnecting the steering wheel 54 from the steering system 24 and to secure the upper shaft 50 and the steering wheel 54 in a stationary position.

Figure 5:
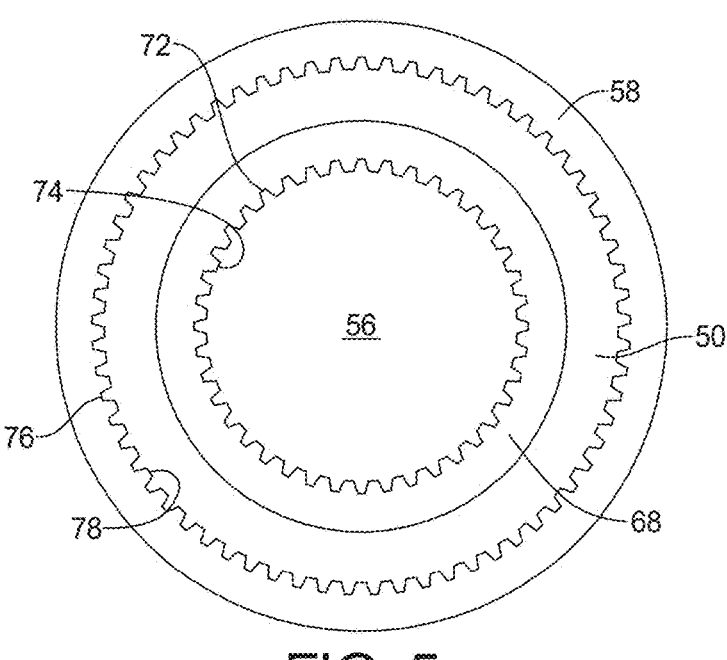
FIG. 5 is a schematic sectional view taken along line 5-5 of FIG. 3.

Referring to FIG. 2, FIG. 3, FIG. 4, FIG. 5 and FIG. 6, in an exemplary embodiment, the lower shaft 56 includes a cylindrical spline collar 68, a distal end 70 of the lower shaft 56 inserted within the spline collar 68, an outer surface 72 of the lower shaft 56 and an inner surface 74 of the cylindrical spline collar 68 having a splined engagement with one another such that the lower shaft 56 and the spline collar 68 rotate unitarily. The second distal end 62 of the upper shaft 50 is cylindrical shaped, the spline collar 68 positioned within the second distal end 62 of the upper shaft 50. The slidable sleeve 58 includes a cylindrical shape and extends around the second distal end 62 of the upper shaft 50, an outer surface 76 of the upper shaft 50 and an inner surface 78 of the slidable sleeve 58 having a splined engagement with one another such that the upper shaft 50 and the slidable sleeve 58 rotate unitarily. Referring to FIG. 4 and FIG. 5, the distal end 70 of the lower shaft 56 is positioned coaxially within the cylindrical spline collar 68 which is positioned coaxially within the cylindrical second distal end 62 of the upper shaft 50 which is positioned coaxially within the cylindrical slidable sleeve 58.

Figure 6:
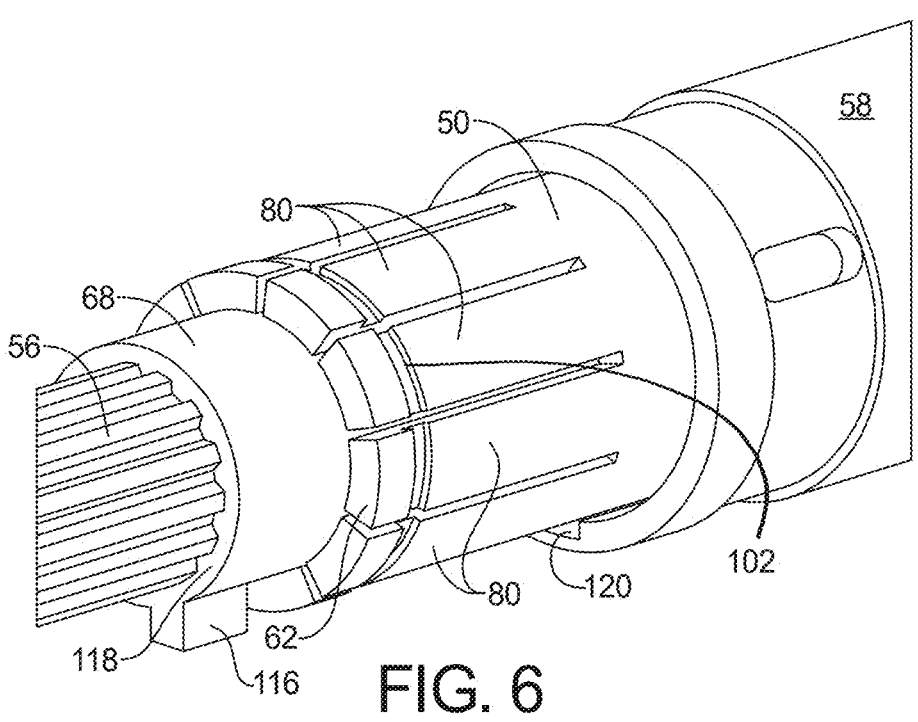
FIG. 6 is a schematic perspective view of a lower shaft, splined collar, upper shaft and slidable sleeve of the steering system, wherein the slidable sleeve is in the disengaged position exposing a plurality of flexible fingers of the upper shaft.
Figure 7:
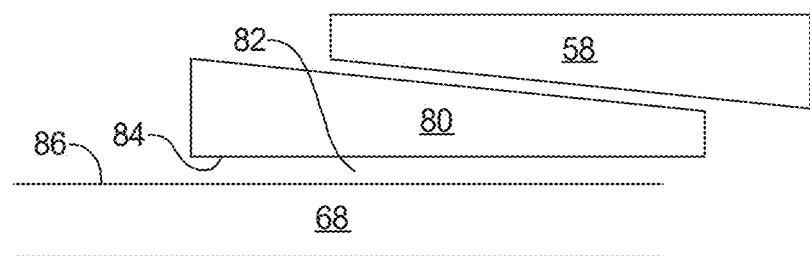
FIG. 7 is a schematic side sectional view illustrating a gap present between the flexible fingers of the upper shaft and the splined collar when the slidable sleeve is in the disengaged position.

Referring to FIG. 6, the second distal end 62 of the upper shaft 50 includes a plurality of flexible fingers 80. Referring to FIG. 7, when the slidable sleeve 58 is in the disengaged position, a gap 82 is present between an inner surface 84 of the flexible fingers 80 of the second distal end 62 of the upper shaft 50 and an outer surface 86 of the splined collar 68, and the splined collar 68 and lower shaft 56 are rotatable relative to the upper shaft 50 and the slidable sleeve 58, functionally disconnecting the steering wheel 54 from the steering system 24.

Figure 8:
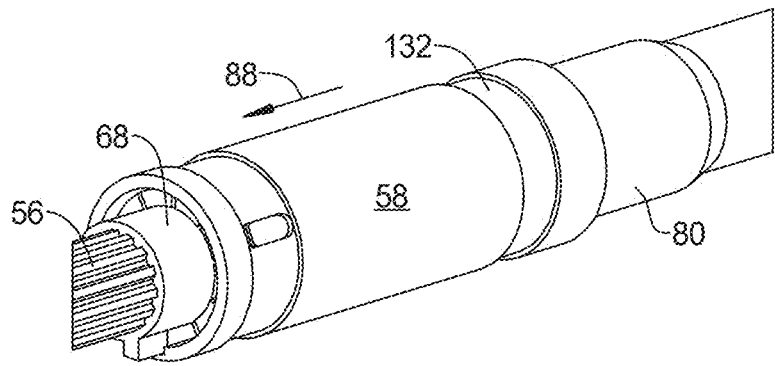
FIG. 8 is a schematic perspective view of the lower shaft, splined collar, upper shaft and slidable sleeve of the steering system, wherein the slidable sleeve is in the engaged position and exerting force onto the flexible fingers of the upper shaft.

Referring to FIG. 8 and FIG. 9, when the slidable sleeve 58 is moved toward the engaged position, as indicated by arrow 88, a ramped inner surface 90 of the slidable sleeve 58 pushes against an outer surface 92 of the flexible fingers 80, as indicated by arrow 94, forcing the inner surface 84 of the flexible fingers 80 into engagement with the outer surface 86 of the splined collar 68, as indicated by arrow 96, wherein the splined collar 68 and the lower shaft 56 are frictionally engaged with the upper shaft 50 such that the lower shaft 56 and the upper shaft 50 rotate unitarily, functionally connecting the steering wheel 54 to the steering system 24. The flexible fingers 80 are naturally, in an un-flexed position, spaced from the outer surface 86 of the spline collar 68, forming the gap 82 therebetween. The outer surface 92 of each of the flexible fingers 80 is ramped corresponding to the ramped inner surface 90 of the slidable sleeve 58, such that when the slidable sleeve 58 is moved toward the engaged position, as indicated by arrow 88, the slidable sleeve 58 pushes on the flexible fingers 80, as indicated by arrow 94 and deflects the flexible fingers 80 inward into contact with the outer surface 86 of the spline collar 68. In an exemplary embodiment, the inner surface 84 of the flexible fingers 80 and the outer surface 86 of the spline collar 68 have surface finishes that, when the inner surface 84 of the flexible fingers 80 and the outer surface 86 of the spline collar 68 are pushed together, the frictional engagement between the inner surface 84 of the flexible fingers 80 and the outer surface 86 of the spline collar 68 is sufficient to carry load of input from the steering wheel 54 and the upper shaft 50 to the spline collar 68 and the lower shaft 56, effectively locking the upper shaft 50 to the lower shaft 56 and functionally connecting the steering wheel 54 to the steering system 24.

Referring to FIG. 10A and FIG. 10B, in an exemplary embodiment, the slidable sleeve 58 includes a flexible inwardly facing tab 98 positioned proximal to a first distal end 100 of the slidable sleeve 58 and the outer surface 92 of the flexible fingers 80 of the upper shaft 50 include a radial notch 102, wherein, when the slidable sleeve 58 is moved to the engaged position, as shown in FIG. 10A, the flexible inwardly facing tab 98 engages the radial notch 102 formed within the outer surface 92 of the flexible fingers 80 to retain the slidable sleeve 58 in the engaged position. When the steering system 24 is actuated to move the slidable sleeve 58 from the engaged position to the disengaged position, once sufficient force is applied to move the slidable sleeve 58, the flexible inward facing tab 98 is adapted to flex radially outward, as indicated by arrow 104, disengaging the flexible inward facing tab 98 from the radial notch 102 of the flexible fingers 80, allowing the slidable sleeve 58 to move from the engaged position toward the disengaged position, as indicated by arrow 106. Under normal operating conditions, no external force will be present to dislodge the flexible inward facing tab 98 from the radial notch 102, thus, keeping the slidable sleeve 58 in the engaged position until selectively and intentionally moved toward the disengaged position. A small force will tend to act on the slidable sleeve 58 to move the slidable sleeve 58 toward the disengaged position that is proportional to the angle of the tapered surface. The force is very small due to the steep angle of the tapered surfaces of the slidable sleeve 58 and the upper shaft 50. The tab 98 is present to prevent that small force from separating the frictional engagement between the slidable sleeve 58 and the upper shaft 50.

In an exemplary embodiment, the steering system 24 includes a stationary jacket 108, the slidable sleeve 58, the second distal end 62 of the upper shaft 50, the spline collar 68 and the distal end 70 of the lower shaft 56 enclosed within the jacket 108. The jacket 108 includes a pin 110 extending radially inward, and the slidable sleeve 58 includes an axial slot 112 formed within a second distal end 114 of the slidable sleeve 58. Referring to FIG. 11A, when the slidable sleeve 58 is in the engaged position, the pin 110 is not engaged with the axial slot 112, allowing the upper shaft 50 and the slidable sleeve 58 to rotate upon input from the steering wheel 54. Referring to FIG. 11B, when the slidable sleeve 58 is in the disengaged position, the pin 110 is adapted to engage the axial slot 112 of the slidable sleeve 58, preventing rotation of the slidable sleeve 58 and the upper shaft 50. Thus, when the slidable sleeve 58 is moved to the disengaged position the upper shaft 50, and thus, the steering wheel 54, is locked in a stationary position. In an exemplary embodiment, the axial slot 112 is positioned such that when the pin 110 is engaged with the axial slot 112, the steering wheel 54 is held stationary in a centered position. To accomplish this, the steering system 24 is adapted to center the steering system 24 and steering wheel 54 while the slidable sleeve 58 is engaged prior to moving the slidable sleeve 58 to the disengaged position, as will be further discussed below.

In another exemplary embodiment, referring again to FIG. 10A and FIG. 10B, the spline collar 68 includes a tab 116 extending radially outward from a distal end 118 of the spline collar 68, the slidable sleeve 58 including an axial notch 120 formed within the first distal end 100 of the slidable sleeve 58, wherein, referring to FIG. 10A, when the slidable sleeve 58 is in the engaged position, the tab 116 of the spline collar 68 engages the axial notch 120 of the slidable sleeve 58. Engagement of the tab 116 of the spline collar 68 with the axial notch 120 of the slidable sleeve 58 prevents rotation of the spline collar 68 and the lower shaft 56 relative to the slidable sleeve 58 and the upper shaft 50. Thus, if the frictional engagement between the inner surface 84 of the flexible fingers 80 of the upper shaft 50 and the outer surface 86 of the spline collar 68 slips, the engagement of the tab 116 of the spline collar 68 with the axial notch 120 of the slidable sleeve 58 prevents rotation of the slidable sleeve 58 and the upper shaft 50 relative to the spline collar 68 and the lower shaft 56, maintaining connection of the steering wheel 54 to the steering system 24. Referring to FIG. 10B, when the slidable sleeve 58 is in the disengaged position, the tab 116 of the spline collar 68 is clear of the axial notch 120 formed in the first distal end 100 of the slidable sleeve 58, and thereby, the slidable sleeve 58 and the upper shaft 50 is rotationally de-coupled from the spline collar 68 and the lower shaft 56.

In an exemplary embodiment, when the slidable sleeve 58 is in the engaged position, the pin 110 is positioned immediately adjacent the second distal end 114 of the slidable sleeve, and clear of the axial slot 112 formed therein, and when the slidable sleeve 58 is in the disengaged position, the tab 116 of the spline collar 68 is positioned immediately adjacent the first distal end 100 of the slidable sleeve 58 and clear of the axial notch 120 formed therein. Thus, during transitional movement of the slidable sleeve 58 between the engaged and disengaged positions, the pin 110 of the jacket 108 is engaged with the axial slot 112 formed within the second distal end 114 of the slidable sleeve 58, and, simul-
taneously, the tab 116 of the spline collar 68 is engaged with
the axial notch 120 formed within the first distal end 100 of
the slidable sleeve 58. When the slidable sleeve 58 moves
from the engaged position toward the disengaged position,
the pin 110 engages the axial slot 112 before the tab 116
clears the axial notch 120, and when the slidable sleeve 58
reaches the fully disengaged position, the pin 110 is fully
engaged within the axial slot 112 and the tab 116 is clear of
the notch 120. Correspondingly, when the slidable sleeve
moves from the disengaged position toward the engaged
position, the tab 116 engages the axial notch 120 before the
pin 110 clears the axial slot 112, and when the slidable sleeve
58 reaches the fully engaged position, the tab 116 is fully
engaged with the axial notch 120 and the pin 110 is clear of
the axial slot 112.

Referring again to FIG. 4, in another exemplary embodi-
ment, the steering system 24 further includes a bushing 122
positioned axially inward from the second distal end 62 and
flexible fingers 80 of the upper shaft 50 between an inner
surface 124 of the upper shaft 50 and the outer surface 86 of
the spline collar 68, the bushing 122 adapted to support the
upper shaft 50 on the spline collar 68 and to allow rotation
of the spline collar 68 relative to the upper shaft 50 when the
slidable sleeve 58 is in the disengaged position.

Referring again to FIG. 4, in another exemplary embodi-
ment, the steering system 24 further includes an axial
retention feature 126 positioned between the inner surface
124 of the upper shaft 50 and the outer surface 86 of the
spline collar 68 and adapted to prevent axial movement of
the upper shaft 50 relative to the spline collar 68. As shown,
the axial retention feature 126 includes a ring positioned,
simultaneously, within a radial slot formed within the inner
surface 124 of the upper shaft 50 and a radial slot formed
within the outer surface 86 of the spline collar 68.

Referring to FIG. 2, the steering system 24 further
includes an actuator 128 adapted to actuate a linkage 130
that engages an outwardly facing radial notch 132 formed
within the slidable sleeve 58 to selectively move the slidable
sleeve 58 back and forth between the engaged position and
the disengaged position. The actuator may be motorized,
such as a linear motor, or may be a manually actuated lever.
It should be understood by those skilled in the art that the
actuator may be any suitable structure or device adapted to
selectively move the slidable sleeve 58 back and forth.

Referring to FIG. 12, the steering system 24 includes an
occupant monitoring system 134 and a human machine
interface (HMI) 136. The occupant monitoring system 134
is adapted to capture images of a user in the vehicle 10 to aid
in identification of the user and determination, by the system
controller 36, of the user's authorization to use the steering
system 24 to engage or disengage the steering wheel 54 from
the steering system 24. The HMI 136 is adapted to allow
communication between the user and the system controller
36 and to display state of operation messages to the user. The
plurality of sensors 40a-40n includes, at least, a steering
wheel torque sensor 138 adapted to measure an amount of
torque being applied to the steering wheel 54 and a steering
wheel position sensor 140 adapted to determine an angular
position of the steering wheel 54.

Referring to FIG. 13A, FIG. 13B and FIG. 13C, a method
200 of operating a steering system 24 within a vehicle 10 to
providing selective disengagement of a steering wheel 54
from the steering system 24 according to an exemplary
embodiment of the present disclosure includes, starting at
block 202, wherein the slidable sleeve 58 of the steering
system is in the engaged position and the vehicle 10 is being operated in a manual mode of operation, moving to block
204, receiving, by the system controller 36, via the human
machine interface (HMI) 136 in communication with the
system controller 36 of the steering system 24, a request
from a user within the vehicle 10 to disengage the steering
wheel 54 from the steering system 24. Such request may be
associated with the user's request to switch to an autono-
mous operation mode of the vehicle 10, wherein connection
of the steering wheel 54 to the steering system 24 is not
necessary and may not be desired.

The method 200 further includes, moving to block 206,
disabling, with the system controller 36, a shift actuator 142
within the vehicle 10 and preventing shifting of the trans-
mission 22 within the vehicle 10 from park. This ensures that
the vehicle 10 is not shifted from park during transition back
and forth between manual and autonomous modes of opera-
tion. Moving to block 208, the method 200 includes sending,
via the HMI 136, a message to the user within the vehicle 10
indicating that disengagement of the steering wheel 54 from
the steering system 24 is taking place and instructing the
user to keep hands off the steering wheel 54, and, moving to
block 210, moving, with the system controller 36, the
slidable sleeve 58 to the disengaged position. Moving the
slidable sleeve includes actuation, by the system controller
36, of the actuator 128 to cause the linkage 130 to move the
slidable sleeve 58.

In an exemplary embodiment, the method 200 further
includes, after receiving, via the HMI 136, the request from
the user to disengage the steering wheel 54 from the steering
system 24 at block 204, moving to block 212, verifying, with
the system controller 36, authorization of the user. The
system controller 36 uses data collected by the occupant
monitoring system 134 and received from the user by the
HMI 136 to determine that the user is authorized to switch
the vehicle 10 between manual and autonomous operation
modes.

If at block 212, the system controller 36 determines that
the user is not authorized, then, moving to block 214, the
method 200 includes, aborting disengagement of the steer-
ing wheel 54 from the steering system 24 and sending a
message to the user that the user is not authorized for such
action, the method 200 then moving back to block 202,
where operation of the vehicle 10 continues in manual mode.

If at block 212, the system controller 36 determines that
the user is authorized, then, moving to block 216, the
method 200 includes verifying, with the system controller
36, that the steering system 24 is operable. The system
controller 24 receives data from the plurality of sensors
40a-40n within the vehicle to determine that all aspects of
the steering system 24 are functioning properly.

If at block 216 the system controller 36 determines that
the steering system 24 is not operable, then, moving to block
218, the method 200 includes aborting disengagement of the
steering wheel 54 from the steering system 24 and sending
a message to the user that the operation is not available, the
method 200 then moving back to block 202, where operation
of the vehicle 10 continues in manual mode.

If, at block 216, the system controller 36 determines that
the steering system 24 is operable, then, moving to block
220, the method 200 includes verifying, with the system
controller 36, that the transmission 22 of the vehicle 10 is in
park.

If at block 220, the system controller 36 determines that
the transmission 22 is not in park, then, moving to block 222,
the method 200 includes aborting disengagement of the
steering wheel 54 from the steering system 36 and sending
a message to the user that the transmission 22 is not in park and instructing the user to shift the transmission 22 to park. This message will remain displayed until the system controller 36 determines, via communication with the plurality of sensors 40a-40n, that the transmission 22 is in park. Once the system controller 36 determines that the transmission 22 is in park, then, the method proceeds to block 206, wherein the shifter is disabled, to block 208, where the message is sent to the user, and to block 210, where the slidable sleeve 58 is moved to the disengaged position.

In another exemplary embodiment, the method 200 further includes, prior to moving the slidable sleeve 58 to the disengaged position, moving to block, measuring, with the system controller 36, via communication with the steering wheel torque sensor 138, torque applied to the steering wheel 54, and, when torque is being applied to the steering wheel 54, moving to block 224, aborting disengagement of the steering wheel 54 from the steering system 24, and, moving to block 226, enabling shifting of the transmission 22 from park and sending a message to the user, and moving back to block 202, where operation of the vehicle 10 continues in manual mode.

In an exemplary embodiment, if, at block 223 torque is detected, then, the system controller 36 reverts back to block 208 and continues to display the message instructing the user to keep hands away from the steering wheel 54. If at block 228, the message has been ignored for less than a pre-determined length of time, then, the method reverts to block 208, and continues displaying the message. If at block 228 the message has been ignored for more than the pre-determined length of time, the method 200 progresses to blocks 224 and 226. If, at block 223, no torque is being applied to the steering wheel 54, the method 200 includes, moving to block 230, centering, with the system controller 36, the steering wheel 54. As mentioned previously, for transition back and forth between engagement and disengagement of the steering wheel 54 to the steering system 24, the steering system 24 and the steering wheel 54 must be in a centered position. Thus, prior to initiating movement of the slidable sleeve 58 at block 210, the steering system 24 and the steering wheel 54 must be centered.

Moving to block 232, the method 200 includes verifying, with the system controller 36, via communication with the steering wheel position sensor 140, that the steering wheel 54 is centered. If at block 232, the steering wheel 54 is not centered, then, moving to block 234, the method 200 includes measuring, with the system controller 36, via communication with the torque sensor 138, torque applied to the steering wheel 54. If at block 234, torque is being applied to the steering wheel 54, then the method 200 reverts to block 208, and repeating the sending, via the HMI 136, the message to the user within the vehicle 10 indicating that disengagement of the steering wheel 54 from the steering system 24 is taking place and to keep hands off the steering wheel 54. If at block 234, torque is not being applied to the steering wheel 54, then the method 200 includes, moving to block 236, aborting disengagement of the steering wheel 54 from the steering system 24, moving to block 238, enabling shifting of the transmission 22 from park, and, moving to block 240, sending a message to the user that the steering system is blocked and moving back to block 202, where operation of the vehicle 10 continues in manual mode. In another exemplary embodiment, the method includes, moving to block 242, disabling future requests to disengage the steering wheel 54.

If, at block 232, the system controller 36 determines that the steering wheel 54 is centered, then the method 200 proceeds to block 210 and moving, with the controller 36, the slidable sleeve 58 to the disengaged position.

Referring to FIG. 13B, after moving, with the system controller 36, the slidable sleeve 58 to the disengaged position at block 210, the method 200 further includes, moving to block 244, measuring, with the system controller 36, an amount of time taken to move the slidable sleeve 58 to the disengaged position. If, at block 244, the amount of time taken to move the slidable sleeve 58 to the disengaged position exceeds a predetermined threshold, then, moving to block 246, the method 200 includes aborting disengagement of the steering wheel 54 from the steering system 24, and, moving to block 248, sending a message to the user that disengagement was unsuccessful and re-engagement of the steering wheel 54 to the steering system 24 is taking place, and moving to block 250, moving, with the system controller 36, the slidable sleeve 58 back to the engaged position.

If, at block 244, the amount of time taken to move the slidable sleeve 58 to the disengaged position does not exceed the predetermined threshold, then the method 200 includes, moving to block 252, sending a message to the user, via the HMI 136, that the steering wheel 54 has been disengaged from the steering system 24 and the vehicle 10 is restricted to autonomous operation, and, moving to block 254, disabling, with the system controller 36, manual driving modes of the vehicle 10.

In another exemplary embodiment, at block 255, wherein the slidable sleeve 58 of the steering system 24 is in the disengaged position and the vehicle 10 is being operated in an autonomous mode of operation, moving to block 256, receiving, by the system controller 36, via the human machine interface (HMI) 136 in communication with the system controller 36 of the steering system 24, a request from a user within the vehicle 10 to engage the steering wheel 54 to the steering system 24, enabling manual operation of the vehicle 10. Such request may be associated with the user's request to switch to a manual operation mode of the vehicle 10, wherein connection of the steering wheel 54 to the steering system 24 is necessary.

The method 200 further includes, moving to block 258, disabling, with the system controller 36, the shift actuator 142 within the vehicle 10 and preventing shifting of the transmission 22 within the vehicle 10 from park. This ensures that the vehicle 10 is not shifted from park during transition back and forth between manual and autonomous modes of operation. Moving to block 260, the method 200 includes sending, via the HMI 136, a message to the user within the vehicle 10 indicating that engagement of the steering wheel 54 from the steering system 24 is taking place and instructing the user to keep hands off the steering wheel 54, and, moving to block 250, moving, with the system controller 36, the slidable sleeve 58 to the engaged position. Moving the slidable sleeve includes actuation, by the system controller 36, of the actuator 128 to cause the linkage 130 to move the slidable sleeve 58.

In an exemplary embodiment, the method 200 further includes, after receiving, via the HMI 136, the request from the user to engage the steering wheel 54 from the steering system 24 at block 256, moving to block 262, verifying, with the system controller 36, authorization of the user. The system controller 36 uses data collected by the occupant monitoring system 134 and received from the user by the HMI 136 to determine that the user is authorized to switch the vehicle 10 between manual and autonomous operation modes.

If at block 262, the system controller 36 determines that the user is not authorized, then, moving to block 264, the method 200 includes, aborting engagement of the steering wheel 54 from the steering system 24 and sending a message to the user that the user is not authorized for such action, the method 200 then moving back to block 255 and operation of the vehicle 10 continuing in autonomous mode.

If at block 262, the system controller 36 determines that the user is authorized, then, moving to block 266, the method 200 includes verifying, with the system controller 36, that the steering system 24 is operable. The system controller 24 receives data from the plurality of sensors 40a-40n within the vehicle to determine that all aspects of the steering system 24 are functioning properly.

If at block 266, the system controller 36 determines that the steering system 24 is not operable, then, moving to block 268, the method 200 includes aborting engagement of the steering wheel 54 from the steering system 24 and sending a message to the user that the operation is not available, the method 200 then moving back to block 255 and operation of the vehicle 10 continuing in autonomous mode.

If, at block 266, the system controller 36 determines that the steering system 24 is operable, then, moving to block 270, the method 200 includes verifying, with the system controller 36, that the transmission 22 of the vehicle 10 is in park.

If at block 270, the system controller 36 determines that the transmission 22 is not in park, then, moving to block 272, the method 200 includes aborting engagement of the steering wheel 54 from the steering system 36 and sending a message to the user that the transmission 22 is not in park and instructing the user to shift the transmission 22 to park. This message will remain displayed until the system controller 36 determines, via communication with the plurality of sensors 40a-40n, that the transmission 22 is in park. Once the system controller 36 determines that the transmission 22 is in park, then, the method 200 proceeds to block 258, wherein the shifter is disabled, to block 260, where the message is sent to the user, and to block 250, where the slidable sleeve 58 is moved to the engaged position.

In another exemplary embodiment, the method 200 includes, moving to block 274, centering, with the system controller 36, the steering wheel 54. As mentioned previously, for transition back and forth between engagement and disengagement of the steering wheel 54 to the steering system 24, the steering system 24 and the steering wheel 54 must be in a centered position. Thus, prior to initiating movement of the slidable sleeve 58 at block 250, the steering system 24 and the steering wheel 54 must be centered.

Moving to block 276, the method 200 includes verifying, with the system controller 36, via communication with the steering wheel position sensor 140, that the steering wheel 54 is centered. If at block 276, the steering wheel 54 is not centered, then, moving to block 278, aborting engagement of the steering wheel 54 from the steering system 24, moving to block 280, aborting centering of the steering wheel 54 and steering system 24, moving to block 282, enabling shifting of the transmission 22 from park, and, moving to block 284, sending a message to the user that the steering system is blocked and moving back to block 255 and operation of the vehicle 10 continuing in autonomous mode.

If, at block 276, the system controller 36 determines that the steering wheel 54 is centered, then the method 200 proceeds to block 250 and moving, with the controller 36, the slidable sleeve 58 to the engaged position.

Referring to FIG. 13C, after moving, with the system controller 36, the slidable sleeve 58 to the engaged position at block 250, the method 200 further includes, moving to block 286, measuring, with the system controller 36, an amount of time taken to move the slidable sleeve 58 to the engaged position and an amount of force, measured by the system controller 36 with a force sensor 144, taken to move the slidable sleeve 58 to the engaged position.

If, at block 286, the amount of time taken to move the slidable sleeve 58 to the engaged position exceeds a predetermined threshold, or, the amount of force necessary to move the slidable sleeve 58 to the engaged position exceeds a predetermined threshold, then, moving to block 288, the method 200 includes moving, with the system controller 36, the slidable sleeve 58 back to the disengaged position. In an exemplary embodiment, if, at block 286, the amount of time taken to move the slidable sleeve 58 to the engaged position exceeds a predetermined threshold, or, the amount of force necessary to move the slidable sleeve 58 to the engaged position exceeds a predetermined threshold, then at block 290, if engagement has been unsuccessful less than a pre-determined number of attempts, then the method 200 includes, moving to block 292, sending a message, via the HMI 136, that engagement was unsuccessful and engagement will be re-attempted, wherein, the method moves back to block 250, wherein movement of the slidable sleeve 58 to the engaged position is once again attempted. If at block 290, engagement has been unsuccessful more than the pre-determined number of attempts, then the method 200 moves to block 288 and moving, with the system controller 36, the slidable sleeve 58 back to the disengaged position.

If at block 286, the amount of time taken to move the slidable sleeve 58 to the engaged position does not exceed the predetermined threshold, and, the amount of force necessary to move the slidable sleeve 58 to the engaged position does not exceed the predetermined threshold, then the method 200 includes, moving to block 294, displaying a message, via the HMI, that the steering wheel 54 is engaged and all driving modes are enabled, moving to block 296, backing the actuator 128 off, releasing pushing pressure from the slidable sleeve 58 to reduce the amount of friction and force on the slidable sleeve 58 during operation of the vehicle 10, and, moving to block 298 enabling the transmission 22 to be shifted from park. The method 200 then reverts back to block 202 and operating the vehicle 10 in manual mode with the slidable sleeve 58 engaged.

In another exemplary embodiment, if at block 286, the amount of time taken to move the slidable sleeve 58 to the engaged position exceeds the predetermined threshold, or, the amount of force necessary to move the slidable sleeve 58 to the engaged position exceeds the predetermined threshold, and, at block 288, the slidable sleeve 58 has been moved back to the disengaged position, the method 200 further includes, moving to block 300, measuring, with the system controller 36, an amount of time taken to move the slidable sleeve 58 back to the disengaged position, and measuring, with the system controller 36, via communication with the force sensor 144, an amount of force necessary to move the slidable sleeve 58 back to the disengaged position.

When, at block 300, the amount of time taken to move the slidable sleeve 58 back to the disengaged position exceeds a predetermined threshold, or, the amount of force necessary to move the slidable sleeve 58 back to the disengaged position exceeds a predetermined threshold, then, moving to block 302, the method 200 includes displaying a message, via the HMI 136, that the vehicle 10 is inoperable.

When, at block 300, the amount of time taken to move the slidable sleeve 58 back to the disengaged position does not exceed the predetermined threshold, and, the amount of force necessary to move the slidable sleeve 58 back to the disengaged position does not exceed the predetermined threshold, then, the method 200 includes, moving to block 304, displaying a message, via the HMI 136, that the steering system 24 needs service, the steering wheel 54 is disengaged from steering system 24 and the vehicle 10 is restricted to autonomous operation, the method 200 reverting back to block 255 and autonomous operation of the vehicle 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A steering system for a vehicle, comprising: an upper shaft having a first distal end adapted to support a steering wheel thereon; a lower shaft, including a cylindrical spline collar, a distal end of the lower shaft inserted within the spline collar, an outer surface of the lower shaft and an inner surface of the spline collar having a splined engagement with one another such that the lower shaft and the spline collar rotate unitarily; and a slidable sleeve selectively moveable between an engaged position and a disengaged position, the spline collar including a tab extending radially outward from a distal end of the spline collar and the slidable sleeve including an axial notch formed within a first distal end of the slidable sleeve, wherein: when in the engaged position, the slidable sleeve is adapted to connect the upper shaft to the lower shaft, functionally connecting the steering wheel to the steering system, the tab of the spline collar engages the axial notch of the slidable sleeve, and engagement of the tab of the spline collar with the axial notch of the slidable sleeve prevents rotation of the spline collar and the lower shaft relative to the slidable sleeve and the upper shaft; and when in the disengaged position, the slidable sleeve is adapted to: disconnect the upper shaft from the lower shaft, functionally disconnecting the steering wheel from the steering system; and secure the upper shaft and the steering wheel in a stationary position.

2. The steering system of claim 1, wherein:
the upper shaft having a cylindrical shaped second distal end, the spline collar positioned within the second distal end of the upper shaft;
the slidable sleeve having a cylindrical shape and extending around the second distal end of the upper shaft, an outer surface of the upper shaft and an inner surface of the slidable sleeve having a splined engagement with one another such that the upper shaft and the slidable sleeve rotate unitarily;
the second distal end of the upper shaft including a plurality of flexible fingers, wherein:
when the slidable sleeve is moved to the disengaged position, a gap is present between an inner surface of the flexible fingers of the second distal end of the upper shaft and an outer surface of the splined collar, and the splined collar and lower shaft are rotatable relative to the upper shaft and the slidable sleeve, functionally disconnecting the steering wheel from the steering system; and
when the slidable sleeve is moved to the engaged position, a ramped inner surface of the slidable sleeve pushes against an outer surface of the flexible fingers forcing an inner surface of the flexible fingers into engagement with an outer surface of the splined collar, wherein the splined collar and lower shaft are frictionally engaged with the lower shaft such that the lower shaft and the upper shaft rotate unitarily, functionally connecting the steering wheel to the steering system.

3. The steering system of claim 2, wherein the slidable sleeve includes a flexible inwardly facing tab positioned proximal to the first distal end of the slidable sleeve and the outer surface of the flexible fingers of the upper shaft include a radial notch, wherein, when the slidable sleeve is moved to the engaged position, the flexible inwardly facing tab engages the radial notch formed within the outer surface of the flexible fingers to retain the slidable sleeve in the engaged position.

4. The steering system of claim 3, wherein the steering system includes a stationary jacket, the slidable sleeve, the second distal end of the upper shaft, the spline collar and the distal end of the lower shaft enclosed within the jacket, the jacket including a pin extending radially inward, the slidable sleeve including an axial slot formed within a second distal end of the slidable sleeve, wherein, when the slidable sleeve is in the disengaged position, the pin is adapted to engage the axial slot of the slidable sleeve, preventing rotation of the slidable sleeve and the upper shaft.

5. The steering system of claim 4, wherein:
when the slidable sleeve is in the engaged position, the pin is positioned immediately adjacent the second distal end of the slidable sleeve;
when the slidable sleeve is in the disengaged position, the tab is positioned immediately adjacent the first distal end of the slidable sleeve; and
during transitional movement of the slidable sleeve between the engaged and disengaged positions, the pin of the jacket is engaged with the axial slot formed within the second distal end of the slidable sleeve, and, simultaneously, the tab of the spline collar is engaged with the axial notch formed within the first distal end of the slidable sleeve.

6. The steering system of claim 5, further including a bushing positioned axially inward from the second distal end and flexible fingers of the upper shaft between an inner surface of the upper shaft and the outer surface of the spline collar, the bushing adapted to allow rotation of the spline collar relative to the upper shaft when the slidable sleeve is in the disengaged position.

7. The steering system of claim 6, further including an axial retention feature positioned between the inner surface of the upper shaft and the outer surface of the spline collar and adapted to prevent axial movement of the upper shaft relative to the spline collar.

8. A method of operating a steering system within a vehicle and providing selective disengagement of a steering wheel from the steering system and selective engagement of the steering wheel to the steering system, the steering system including: an upper shaft having a first distal end adapted to support a steering wheel thereon; a lower shaft, including a cylindrical spline collar, a distal end of the lower shaft inserted within the spline collar, an outer surface of the lower shaft and an inner surface of the spline collar having a splined engagement with one another such that the lower shaft and the spline collar rotate unitarily; and a slidable sleeve selectively moveable between an engaged position and a disengaged position, the spline collar including a tab extending radially outward from a distal end of the spline collar and the slidable sleeve including an axial notch formed within a first distal end of the slidable sleeve, wherein: when in the engaged position, the slidable sleeve is adapted to connect the upper shaft to the lower shaft, functionally connecting the steering wheel to the steering system, the tab of the spline collar engages the axial notch of the slidable sleeve, and engagement of the tab of the spline collar with the axial notch of the slidable sleeve prevents rotation of the spline collar and the lower shaft relative to the slidable sleeve and the upper shaft; and when in the disengaged position, the slidable sleeve is adapted to disconnect the upper shaft from the lower shaft, functionally disconnecting the steering wheel from the steering system, and to secure the upper shaft and the steering wheel in a stationary position; the method including: receiving, by a system controller, via a human machine interface (HMI) in communication with the system controller of the steering system, a request from a user within the vehicle to disengage the steering wheel from the steering system; disabling, with the system controller, a shift actuator within the vehicle and preventing shifting of the transmission within the vehicle from park; sending, via the HMI, a message to the user within the vehicle indicating that disengagement of the steering wheel from the steering system is taking place and to keep hands off the steering wheel; and moving, with the controller, the slidable sleeve to the disengaged position; and disengaging the tab of the spline collar from the axial notch of the slidable sleeve, and allowing rotation of the spline collar and the lower shaft relative to the slidable sleeve and the upper shaft.

9. The method of claim 8, wherein after receiving, via HMI, the request from the user to disengage the steering wheel from the steering system, the method includes:

verifying, with the system controller, authorization of the user;

verifying, with the system controller, that the steering system is operable;

verifying, with the system controller, that a transmission of the vehicle is in park;

aborting disengagement of the steering wheel from the steering system and sending a message to the user when the user is not authorized;

aborting disengagement of the steering wheel from the steering system and sending a message to the user when the steering system is inoperable; and aborting disengagement of the steering wheel from the steering system and sending a message to the user when the transmission of the vehicle is not in park.

10. The method of claim 9, further including, prior to moving the slidable sleeve to the disengaged position:

measuring, with the system controller, via communication with a torque sensor, torque applied to the steering wheel;

when torque is being applied to the steering wheel, aborting disengagement of the steering wheel from the steering system, enabling shifting of the transmission from park and sending a message to the user; and when no torque is being applied to the steering wheel, centering, with the system controller, the steering wheel.

11. The method of claim 10, further including:

verifying, with the system controller, via communication with a position sensor, that the steering wheel is centered;

when the steering wheel is not centered, measuring, with the system controller, via communication with the torque sensor, torque applied to the steering wheel; and when torque is being applied to the steering wheel, repeating the sending, via the HMI, the message to the user within the vehicle indicating that disengagement of the steering wheel from the steering system is taking place and to keep hands off the steering wheel;

when torque is not being applied to the steering wheel, aborting disengagement of the steering wheel from the steering system, enabling shifting of the transmission from park and sending a message to the user that the steering system is blocked; and when the steering wheel is centered, proceeding with the moving, with the controller, the slidable sleeve to the disengaged position.

12. The method of claim 11, further including, after moving, with the system controller, the slidable sleeve to the disengaged position:

measuring, with the system controller, an amount of time taken to move the slidable sleeve to the disengaged position; and when the amount of time taken to move the slidable sleeve to the disengaged position exceeds a predetermined threshold, aborting disengagement of the steering wheel from the steering system and sending a message to the user that disengagement was unsuccessful and re-engagement of the steering wheel to the steering system is taking place; and when the amount of time taken to move the slidable sleeve to the disengaged position does not exceed the predetermined threshold:

sending a message to the user, via the HMI, that the steering wheel has been disengaged from the steering system and the vehicle is restricted to autonomous operation; and disabling, with the system controller, manual driving modes of the vehicle.

13. The method of claim 12, further including:

receiving, by the system controller, via the human machine interface (HMI) in communication with the system controller of the steering system, a request from the user within the vehicle to engage the steering wheel to the steering system;

disabling, with the system controller, a shift actuator within the vehicle and preventing shifting of the transmission within the vehicle from park;

sending, via the HMI, a message to the user within the vehicle indicating that disengagement of the steering wheel from the steering system is taking place and to keep hands off the steering wheel; and moving, with the controller, the slidable sleeve to the engaged position; and engaging the tab of the spline collar within the axial notch of the slidable sleeve, and preventing rotation of the spline collar and the lower shaft relative to the slidable sleeve and the upper shaft.

14. The method of claim 13, wherein after receiving, via the HMI, the request from the user to engage the steering wheel from the steering system, the method includes:

verifying, with the system controller, authorization of the user;

verifying, with the system controller, that the steering system is operable;

verifying, with the system controller, that the transmission of the vehicle is in park;

aborting engagement of the steering wheel to the steering system and sending a message to the user when the user is not authorized;

aborting engagement of the steering wheel to the steering system and sending a message to the user when the steering system is inoperable; and aborting engagement of the steering wheel to the steering system and sending a message to the user when the transmission of the vehicle is not in park.

15. The method of claim 10, further including, prior to moving the slidable sleeve to the engaged position:

centering, with the system controller, the steering system;

verifying, with the system controller, that the steering system is centered;

when the steering system is not centered:

sending a message to the user that engagement was unsuccessful;

aborting centering of the steering system;

aborting engagement of the steering wheel to the steering system; and enabling shifting of the transmission from park; and when the steering system is centered, proceeding with moving the slidable sleeve to the engaged position.

16. The method of claim 15, further including:

measuring, with the system controller, an amount of time taken to move the slidable sleeve to the engaged position;

measuring, with the system controller, via communication with a force sensor, an amount of force necessary to move the slidable sleeve to the engaged position;

when the amount of time taken to move the slidable sleeve to the engaged position exceeds a predetermined threshold, or, the amount of force necessary to move the slidable sleeve to the engaged position exceeds a predetermined threshold, moving, with the system controller, the slidable sleeve back to the disengaged position; and when the amount of time taken to move the slidable sleeve to the engaged position does not exceed the predetermined threshold, and, the amount of force necessary to move the slidable sleeve to the engaged position does not exceed the predetermined threshold, displaying a message, via the HMI, that the steering wheel is engaged and all driving modes are enabled, and enabling the transmission to be shifted from park.

17. The method of claim 16, wherein, when the amount of time taken to move the slidable sleeve to the engaged position exceeds a predetermined threshold, or, the amount of force necessary to move the slidable sleeve to the engaged position exceeds a predetermined threshold, and the slidable sleeve has been moved back to the disengaged position, the method further includes:

measuring, with the system controller, an amount of time taken to move the slidable sleeve back to the disengaged position;

measuring, with the system controller, via communication with the force sensor, an amount of force necessary to move the slidable sleeve back to the disengaged position;

when the amount of time taken to move the slidable sleeve back to the disengaged position exceeds a predetermined threshold, or, the amount of force necessary to move the slidable sleeve back to the disengaged position exceeds a predetermined threshold, displaying a message, via the HMI, that the vehicle is inoperable; and when the amount of time taken to move the slidable sleeve back to the disengaged position does not exceed the predetermined threshold, and, the amount of force necessary to move the slidable sleeve back to the disengaged position does not exceed the predetermined threshold, displaying a message, via the HMI, that the steering system needs service, the steering wheel is disengaged from steering system and the vehicle is restricted to autonomous operation.

18. A vehicle having a steering system, the steering system comprising: an upper shaft having a first distal end adapted to support a steering wheel thereon and a second distal end including a plurality of flexible fingers; a lower shaft; a cylindrical spline collar, a distal end of the lower shaft inserted within the spline collar, an outer surface of the lower shaft and an inner surface of the spline collar having a splined engagement with one another such that the lower shaft and the spline collar rotate unitarily; the upper shaft having a cylindrical shaped second distal end, the spline collar positioned within the second distal end of the upper shaft; and a slidable sleeve having a cylindrical shape and extending around the second distal end of the upper shaft, an outer surface of the upper shaft and an inner surface of the slidable sleeve having a splined engagement with one another such that the upper shaft and the slidable sleeve rotate unitarily, the slidable shaft selectively moveable between an engaged position and a disengaged position, the spline collar including a tab extending radially outward from a distal end of the spline collar and the slidable sleeve including an axial notch formed within a first distal end of the slidable sleeve, wherein; when the slidable sleeve is moved to the disengaged position, a gap is present between an inner surface of the flexible fingers of the second distal end of the upper shaft and an outer surface of the splined collar, and the splined collar and lower shaft are rotatable relative to the upper shaft and the slidable sleeve, functionally disconnecting the steering wheel from the steering system; and when the slidable sleeve is moved to the engaged position, a ramped inner surface of the slidable sleeve pushes against an outer surface of the flexible fingers forcing an inner surface of the flexible fingers into engagement with an outer surface of the splined collar, wherein the splined collar and lower shaft are frictionally engaged with the lower shaft such that the lower shaft and the upper shaft rotate unitarily, functionally connecting the steering wheel to the steering system, and the tab of the spline collar engages the axial notch of the slidable sleeve, and engagement of the tab of the spline collar with the axial notch of the slidable sleeve prevents rotation of the spline collar and the lower shaft relative to the slidable sleeve and the upper shaft.

19. The vehicle of claim 18, wherein: the slidable sleeve includes a flexible inwardly facing tab positioned proximal to the first distal end of the slidable sleeve and the outer surface of the flexible fingers of the upper shaft include a radial notch, wherein, when the slidable sleeve is moved to the engaged position, the flexible inwardly facing tab engages the radial notch formed within the outer surface of the flexible fingers to retain the slidable sleeve in the engaged position; a stationary jacket, the slidable sleeve, the second distal end of the upper shaft, the spline collar and the distal end of the lower shaft enclosed within the jacket, the jacket including a pin extending radially inward, the slidable sleeve including an axial slot formed within a second distal end of the slidable sleeve, wherein, when the slidable sleeve is in the disengaged position, the pin is adapted to engage the axial slot of the slidable sleeve, preventing rotation of the slidable sleeve and the upper shaft; the spline collar includes a tab extending radially outward from a distal end of the spline collar, the slidable sleeve including an axial notch formed within the first distal end of the slidable sleeve, wherein, when the slidable sleeve is in the engaged position, the tab of the spline collar engages the axial notch of the slidable sleeve, wherein engagement of the tab of the spline collar with the axial notch of the slidable sleeve prevents rotation of the spline collar and the lower shaft relative to the slidable sleeve and the upper shaft; and when the slidable sleeve is in the engaged position, the pin is positioned immediately adjacent the second distal end of the slidable sleeve, when the slidable sleeve is in the disengaged position, the tab is positioned immediately adjacent the first distal end of the slidable sleeve, and during transitional 5 movement of the slidable sleeve between the engaged and disengaged positions, the pin of the jacket is engaged with the axial slot formed within the second distal end of the slidable sleeve, and, simultaneously, the tab of the spline collar is engaged with the axial notch formed within the first 10 distal end of the slidable sleeve.

20. The steering system of claim 6, wherein the bushing is adapted to support the upper shaft on the spline collar.

* * * * *